United States Patent Office 3,071,971
Patented Jan. 8, 1963

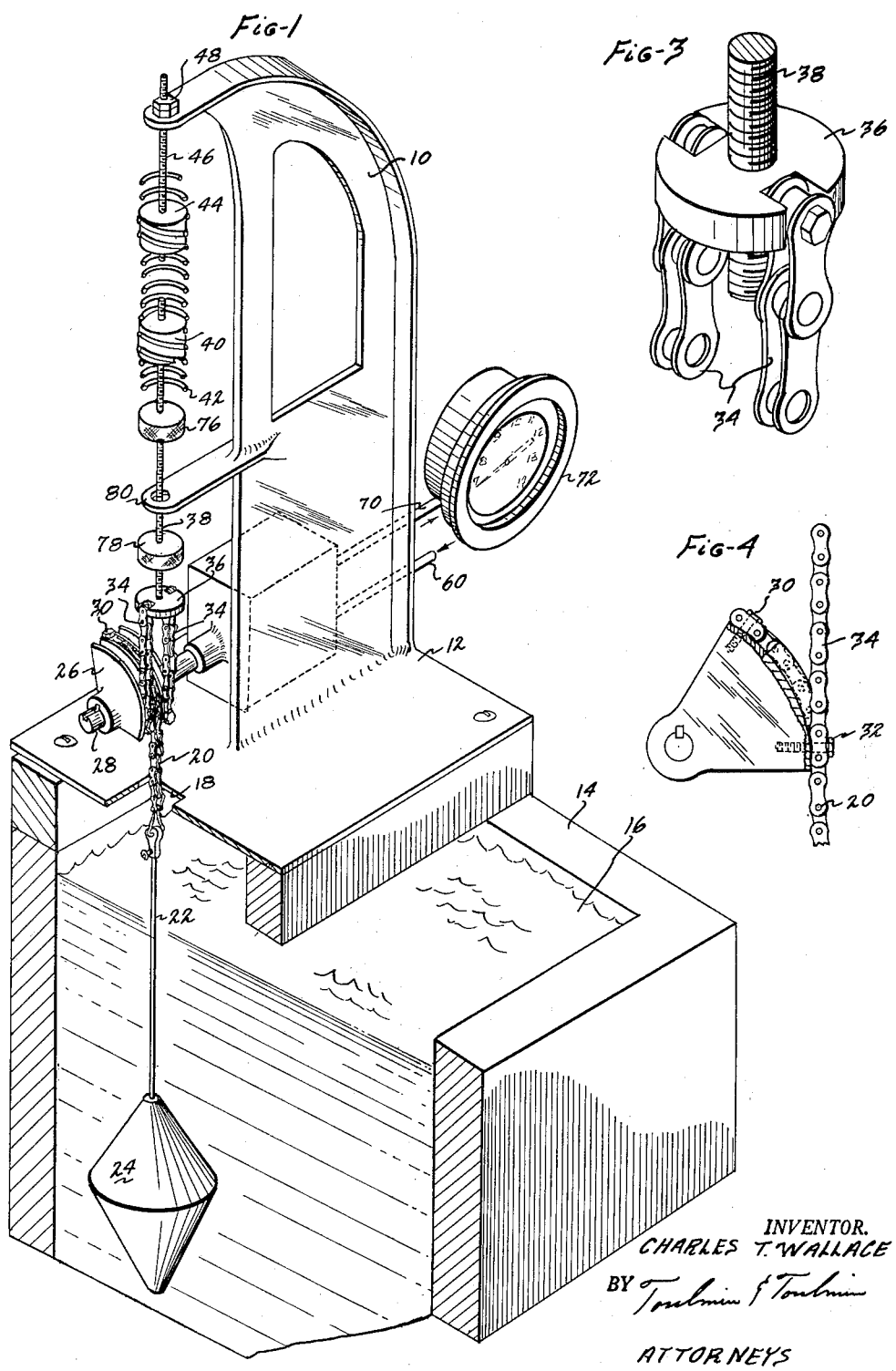

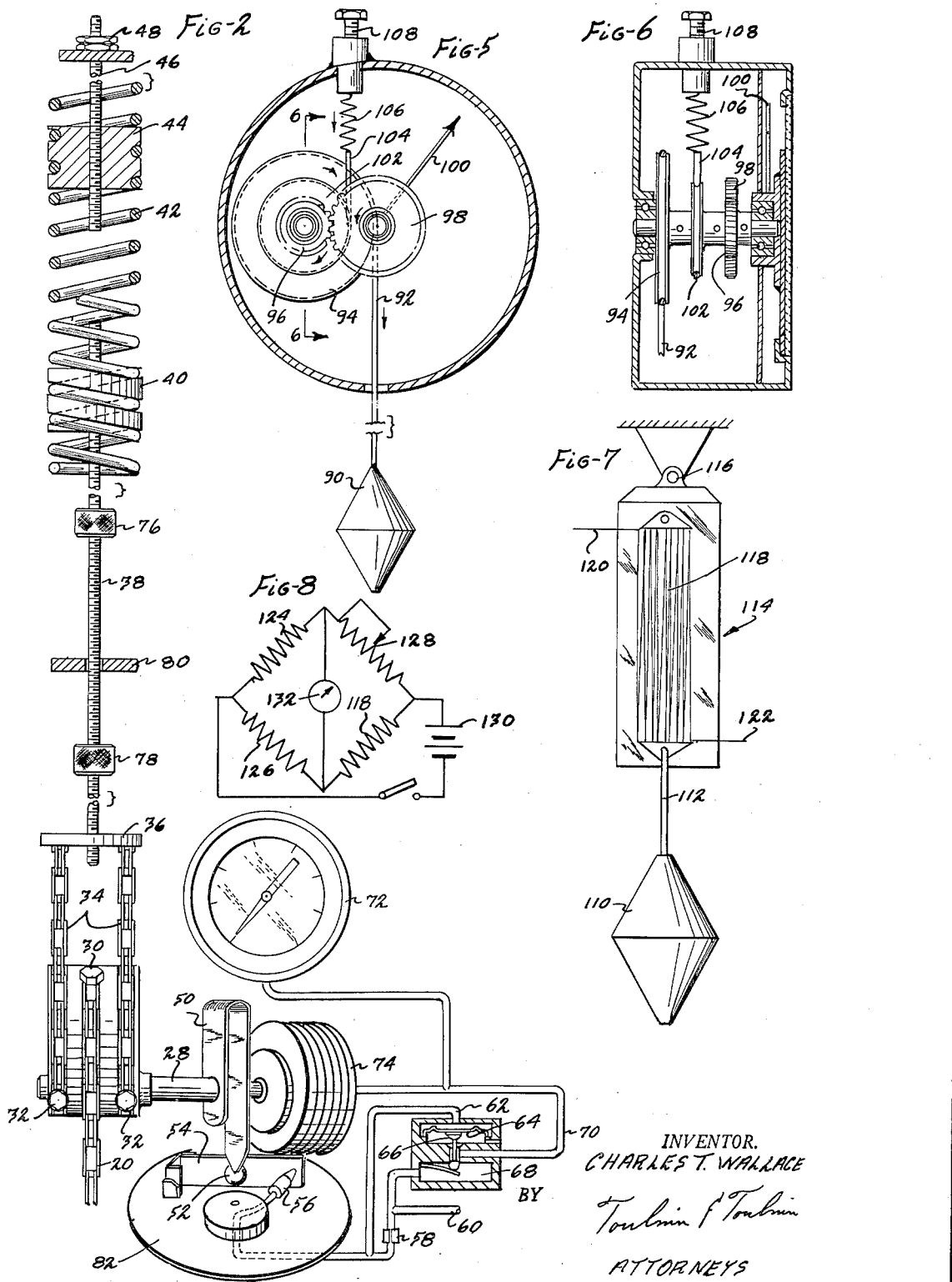

3,071,971
METHOD AND APPARATUS FOR MEASURING FLUID DENSITIES
Charles T. Wallace, Lake Charles, La.
(P.O. Box 213, Kinder, La.)
Filed Sept. 21, 1959, Ser. No. 841,144
3 Claims. (Cl. 73—451)

This invention relates to a method and apparatus for detecting and indicating the specific gravity of fluids and is particularly concerned with such a method and apparatus in connection with the measurement of the density of fluids such as slurries and in particular drilling muds.

In the art of drilling wells a great deal of drilling mud is employed and it is necessary both for efficient drilling practices and for reasons of economy to effect close control of the density of the drilling mud or drilling fluid. Heretofore there has been no adequate provision for effecting this measurement and as a result drilling muds tend to become more and more dense as drilling proceeds. This is due in part to solids that become entrained in the mud from the drilling operation and in part due to evaporation from the drilling muds as the muds are recirculated.

With the foregoing in mind, it is a particular object of the present invention to provide a method and apparatus which will accurately indicate the density of fluids such as drilling muds.

A still further object is the provision of a method and apparatus for detecting and indicating the density of the drilling muds which will provide a continuous reading.

A still further object of this invention is the provision of a method and apparatus for detecting and indicating the density of fluids such as drilling fluids or muds which is readily portable so that it can be used in the field thereby eliminating the necessity for transporting samples of the fluid to the device to effect the measurement thereof.

In general, the objectives of this invention are realized by providing an element which can be submerged in the fluid to be measured and to which element is attached a sensitive measuring device for detecting the gravitational pull on the element so that the buoyant effect of the fluid upon the element will influence the reading of the indicating device thereby giving a direct reading of the specific gravity of the fluid.

In the preferred form of the present invention the detecting and indicating mechanism comprises a fluid operated gauge controlled by pneumatic pressure which is varied in response to vertical movements of the element in the fluid being measured on account of the buoyant effect of the liquid thereon. An adjustable spring and adjustable stops control the sensitivity of the arrangement and determine the limits within which the specific gravity of the liquid can be measured.

In a modified form of the invention, an electrical detecting and indicating arrangement is employed with the detecting portion of the arrangement including a strain gauge which is sensitive to the downward pull exerted thereon by the fluid element that is submerged in the liquid being measured.

The foregoing objects as well as still other objects and advantages will become more apparent upon reference to the drawings in which:

FIGURE 1 is a perspective view showing the preferred form of my fluid density detecting and indicating device mounted on a tank or container containing the liquid, the density of which is to be measured;

FIGURE 2 is a rather diagrammatic view showing the essential operating elements of the modification of FIGURE 1;

FIGURE 3 is a fragmentary perspective view showing a portion of the device;

FIGURE 4 is a fragmentary view showing a sector member connected between the float and the spring therefor and to which sector is connected a shaft, the rotation of which influences the indicating instrument;

FIGURE 5 is a rather diagrammatic sectional view showing a modified arrangement in which the float is connected directly to an indicating mechanism;

FIGURE 6 is a sectional view indicated by line 6—6 on FIGURE 5;

FIGURE 7 is a diagrammatic view showing the manner in which a strain gauge could be connected with the float so that changes in apparent weight of the float would produce a resistance change in the strain gauge; and FIGURE 8 is a diagrammatic representative of a Wheatstone circuit in which the strain gauge of FIGURE 7 could be connected.

Referring to the drawings somewhat more in detail, the modification of my invention illustrated in FIGURE 1 comprises a frame part 10 that includes a base 12 so that the frame can be mounted on a tank or container or trough 14 which contains the fluid 16, the specific gravity of which is to be measured.

The base 12 has an aperture 18 and extending through the aperture is a flexible element such as a chain 20 that is connected at its lower end to a rod 22 that carries at its lower end a float element 24 of a specific gravity at least slightly greater than the greatest specific gravity of the fluid to be measured.

Chain 20 at its upper end passes about a sector or portion of a blank gear 26 that is mounted on a shaft 28.

The chain 20 is connected to the extreme upper portion of the sector as by a cap screw 30 as will be seen in FIGURE 4.

Attached to the lower end of the sector as by cap screws 32 and extending upwardly therefrom are spaced chain or flexible members 34, one on each side of chain 20. Chains or flexible elements 34 are connected at their upper ends to opposite sides of a disc 36 which has a central threaded hole into which a threaded rod 38 extends. Rod 38 extends upwardly in frame 10 and its upper end has threadedly connected thereto a block 40 which has an external thread thereon of the same pitch as that of spring 42 so that the block can be threaded upwardly and downwardly within the spring thereby to determine the number of free convolutions in the spring thereby to regulate the extensibility of the spring in response to any given load thereon. A similar block 44 is threaded into the upper end of spring 42 and in turn has threaded therein a rod 46 that extends through a hole in the upper end of frame 10 and is anchored in place by nuts 48.

It will be evident from the foregoing that vertical movements of float 24 will be accomplished by rotation of sector 26 and the shaft 28 to which it is attached. The rotation of the shaft as caused by vertical movements of the float and which float movements are caused by changes in density of the fluid in which the float is submerged is utilized for creating a varying signal that actuates an indicating instrument.

According to the preferred modification this is accomplished pneumatically as is diagrammatically illustrated in FIGURE 2. From FIGURE 2 it will be noted that shaft 28 is connected to one leg of a resilient U-shaped arm 50, the other leg of which carries a nylon ball 52 that bears against a spring leaf 54. Rotation of shaft 28 will cause movement of arm 50 so that spring leaf 54 is deflected.

Spring leaf 54 at its outer end controls a jet 56 that is supplied via restrictor orifice 58 from a conduit 60 that is under controlled air pressure. The arrangement is such that upward movement of the float element will cause the spring leaf to move toward jet 56 thus increasing the pressure on the downstream side of restrictor orifice 58. The downstream side of the restrictor orifice 58 is connected by a conduit 62 with the upper surface of a diaphragm 64 that controls a valve 66. Valve 66 controls communication between the chamber 68 that is connected with the air pressure supply conduit 60 and a conduit 70 leading to pneumatic indicating instrument 72.

Conduit 70 also leads to a feed back bellows 74 that has its movable end bearing against the said other leg of U-shaped arm 50 so that the increase in pressure in conduit 70 deflects the said other leg of the U-shaped arm and tends to restore spring leaf 54 to its original position relative to jet 56. A position of balance is reached at which the pressure in conduit 70 is stabilized and this pressure is indicated on indicating instrument 72. In this manner a substantial rotation of shaft 28 can be converted into an indication on instrument 72 which will exactly indicate the amount of movement of the float element in the liquid thereby indicating the specific gravity of the liquid.

It will be apparent that the greater the specific gravity of the liquid, the higher the position of the float element and the greater the deflection of the indicating instrument 72 while conversely the lower the specific gravity of the liquid the lower the position of the float element and the smaller the reading of the indicating instrument.

The movement of the float in the liquid can be regulated by adjustment of the blocks 40 and 44 in the spring 42 since this will adjust the number of free convolutions of the spring while the extreme limits of movement of the float can be regulated by the adjustable stop elements 76 and 78 which are threaded on rod 38 on opposite sides of an aperatured arm 80 rigid with frame 10 and through which rod 38 extends.

The described instrument is rugged and trouble free and can easily be transported and used wherever it is convenient to measure the density of a liquid.

The mechanism can easily be adjusted to meet varying conditions by availing of the blocks 40 and 44 and the stop members 76 and 78 and also by rotatably adjusting the disc 82 on which spring leaf 54 and jet 56 are mounted. The instrument can thus be utilized for measuring the specific gravity of fluids over a wide range of specific gravities, instantaneously and continuously and by bringing the mechanism to the liquids to be measured rather than conveying the liquids to the instrument.

The pneumatic arrangement above described is the preferred arrangement on account of its simplicity and reliability and ease of adjustment but other detecting and indicating arrangements could also be employed.

In FIGURES 5 and 6, for example, I show the float element 90 attached to a flexible member 92 that passes around a pulley 94 mounted on the same shaft with a gear 96 that meshes with a gear 98 to which is attached an indicating pointer 100 that sweeps over a suitably calibrated dial. On the same shaft with gear 96 is a drum or pulley 102 about which a flexible member 104 passes and which is connected to a spring 106 adjustably anchored as by screw 108. The arrangement of FIGURES 5 and 6 might be employed, for example, in circumstances where the liquid to be measured was always within relatively close limits of specific gravity whereby the wide range of adjustability and flexibility of the first described modification would not be essential for measuring the specific gravities of the liquid.

In FIGURES 7 and 8 I show another modification wherein float element 110 is supported on a rod 112 that is connected at its upper end to an electric strain gauge element 114 which has its upper end stationarily anchored at 116. The strain gauge element comprises a resistance wire 118 which is highly sensitive to changes in tension thereon. The element comprises terminals 120 and 122 and is connected in the Wheatstone bridge as is diagrammatically illustrated in FIGURE 8.

In FIGURE 8 strain gauge resistor element 118 is in circuit with the fixed resistors 124 and 126 and the adjustable calibrating resistor 128. A battery 130 is connected across the outer corners of the Wheatstone bridge and an electrical indicating instrument 132 is connected across the other corners of the bridge. The modification of FIGURES 7 and 8 can be made relatively sensitive and would find a field of use similar to that of the modification of FIGURES 5 and 6.

I find it advantageous to form metallic members of the mechanism, such as the float element and the threaded rods and other parts of stainless steel or manganese bronze or the like whereby to inhibit rust and corrosion, but it will be evident that the particular materials employed are not critical.

It will be understood that this invention is susceptible to modification in order to adapt it to different usages and conditions; and, accordingly, it is desired to comprehend such modificaions within this invention as may fall within the scope of the appended claims.

I claim:

1. In a device for detecting and indicating the specific gravity of fluids; a frame, a rotatable shaft in the frame, pulley means connected with the shaft, first flexible means connected with the pulley means and extending downwardly therefrom, a float element attached to the lower end of said first flexible means adapted for being submerged in the liquid to be measured, a second flexible means attached to the pulley and extending upwardly therefrom, an extensible coil spring, means connecting the upper end of the spring to the frame and the lower end of the spring to the upper end of said second flexible means, and means sensitive to rotation of said shaft for indicating the rotated position of the shaft and therefore the vertical position of said float element, the said means connecting the upper end of the spring to the frame comprising a block threaded into the spring whereby adjustment of the block within the spring will adjust the number of free convolutions thereof and thereby adjust the sensitivity of the device, said means sensitive to rotation of said shaft comprising a pneumatic indicating instrument sensitive to pneumatic pressure, a source of pneumatic pressure, and a transmitter connected between said source and said indicating instrument and having adjustable means connected with said shaft so that rotation of said shaft will vary the supply of pressure to said indicating instrument whereby the indication of the indicating instrument reflects the position of said shaft and, therefore, the position of said float element.

2. In a device for detecting and indicating the specific gravity of fluids; a frame, a rotatable shaft in the frame, pulley means connected with the shaft, first flexible means connected with the pulley means and extending downwardly therefrom, a float element attached to the lower end of said first flexible means adapted for being submerged in the liquid to be measured, a second flexible means attached to the pulley and extending upwardly therefrom, an extensible coil spring, means connecting the upper end of the spring to the frame and the lower end of the spring to the upper end of said second flexible means, and means sensitive to rotation of said shaft for indicating the rotated position of the shaft and therefore the vertical position of said float element, at least one of said means connecting the said spring to said frame and to said second flexible means comprising a block threaded into the spring whereby the block can be adjusted within the spring to vary the number of free convolutions thereof, said means sensitive to rotation of said shaft comprising a pneumatic indicating instrument sensitive to pneumatic pressure, a source of pneumatic pressure, and a transmitter connected between said source and said indicating instrument and having adjustable means connected with said shaft so that rotation of said shaft will vary the supply of pressure to said indicating instrument whereby the indication of the indicating instrument reflects the position of said shaft and, therefore, the position of said float element.

3. A device for detecting and indicating the specific gravity of fluids according to claim 1 in which the said means connecting the said second flexible means with said spring includes a threaded rod interposed between said second flexible means and said spring movable in the direction of its length as the spring flexes, spaced stop nuts on the rod, and an arm on said frame located between said nuts whereby adjustable limits of movement of said float element are had.

References Cited in the file of this patent

UNITED STATES PATENTS

| | | |
|---|---|---|
| 510,311 | Bartholomew | Dec. 5, 1893 |
| 1,249,262 | Weber | Dec. 4, 1917 |
| 1,788,465 | Lamar | Jan. 13, 1931 |
| 1,957,941 | Coe | May 8, 1934 |
| 2,094,768 | Cruise et al. | Oct. 5, 1937 |
| 2,599,159 | Breedlove | June 3, 1952 |
| 2,607,214 | Schlueter | Aug. 19, 1952 |
| 2,658,392 | Vannah | Nov. 10, 1953 |
| 2,688,868 | Elkins | Sept. 14, 1954 |

FOREIGN PATENTS

| | | |
|---|---|---|
| 270,922 | Great Britain | Feb. 10, 1927 |